United States Patent [19]

Shigesada et al.

[11] Patent Number: 4,648,648
[45] Date of Patent: Mar. 10, 1987

[54] REMOVABLY PIVOTED REAR PARCEL SHELF FOR HATCHBACK TYPE VEHICLE

[75] Inventors: Masaaki Shigesada, Hadano; Norio Kazama, Yokohama, both of Japan

[73] Assignee: Nissan Motor Co., Ltd., Yokohama, Japan

[21] Appl. No.: 809,403

[22] Filed: Dec. 16, 1985

[30] Foreign Application Priority Data

Jan. 18, 1985 [JP] Japan ................................. 60-7110

[51] Int. Cl.$^4$ .............................................. B60R 3/08
[52] U.S. Cl. .................................... 296/37.16; 296/76
[58] Field of Search .................. 296/37.16, 37.8, 37.1; 224/42.42 R

[56] References Cited

U.S. PATENT DOCUMENTS

| | | | |
|---|---|---|---|
| 4,073,534 | 2/1978 | Hira | 296/37.16 |
| 4,202,578 | 5/1980 | Roullier et al. | 296/37.16 |
| 4,479,675 | 10/1984 | Zankl | 296/37.16 |

FOREIGN PATENT DOCUMENTS 149838  8/1984  Japan ................................. 296/37.16

OTHER PUBLICATIONS

Nissan Service Bulletin No. 440, p. 230.

Primary Examiner—Robert R. Song
Attorney, Agent, or Firm—Schwartz, Jeffery, Schwaab, Mack, Blumenthal & Evans

[57] ABSTRACT

A tonneau board for serving as a rear parcel shelf of a hatchback type vehicle is removably pivoted at the front end on right and left rear parcel side trims. The rear end of the tonneau board is formed with a projection projecting downwardly. When the board is placed in its fixed position, the rear end projection of the board abuts against a rearwardly facing surface of a stopper portion formed in each trim so as to facilitate positioning of the board. When the board is in the fixed position and simultaneously the back door is closed, the rear end projection is clamped between the stopper portion of each trim and the back door so as to fix the rear end of the board firmly.

7 Claims, 8 Drawing Figures

REMOVABLY PIVOTED REAR PARCEL SHELF FOR HATCHBACK TYPE VEHICLE

BACKGROUND OF THE INVENTION

The present invention relates to a mounting arrangement of a tonneau board which is mounted on right and left rear parcel side trims of a hatchback type vehicle for serving as a rear parcel shelf and as a lid for a luggage room, or a trunk compartment. The tonneau board is pivoted at the front, so that the rear end of the tonneau board can be lifted up when a back door of the vehicle is opened. The pivotal connection between the front of the tonneau board and the vehicle body is capable of being disconnected, so that the tonneau board is removable.

SUMMARY OF THE INVENTION

It is an object of the present invention to provide a mounting arrangement of a tonneau board of such a kind which is superior in ability of fixing the tonneau board against vehicle body vibrations, and convenient for installation of the tonneau board, and safe because of its ability of preventing the tonneau board from plunging into the passenger compartment in case of a rear end collision of the vehicle.

According to the present invention, a vehicle comprises a vehicle body, a back door, a tonneau board for serving as a rear parcel shelf, and pivot means. The vehicle body has at least one support portion, or a stopper portion. The back door is pivotally supported on the vehicle body. The board serves as a rear parcel shelf when the board is placed in a fixed position within the vehicle body. The board has a front end and a rear end. The rear end of the board abuts against the support portion of the vehicle body in such a manner as to limit the board from moving forwardly of the vehicle body when the board is in the fixed position. The rear end of the board is clamped between the support portion of the vehicle body and the back door when the board is in the fixed position and at the same time the back door is closed. The pivot means connects the front end of the board with the vehicle body and permits the board to swing about a pivot axis extending laterally of the vehicle body from the fixed position to an open position in which the rear end of the board is lifted up. The pivot means further permits the front end of the board to be disconnected from the vehicle body, so that the board is easily removable from the vehicle body.

DETAILED DESCRIPTION OF THE INVENTION

Figure 5:
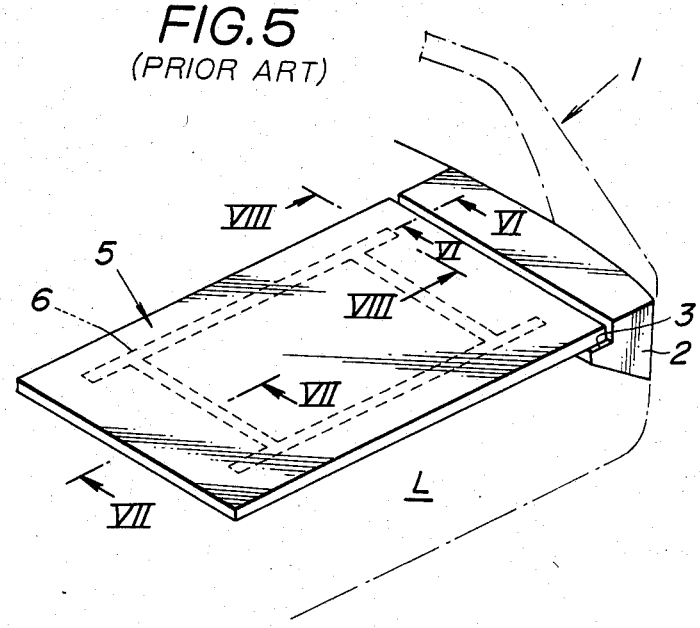
FIG. 5 is a perspective view showing a conventional arrangement.
Figure 6:
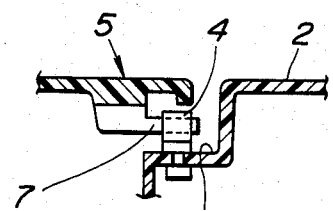
FIG. 6 is a sectional view taken along a line VI—VI of FIG. 5.
Figure 7:
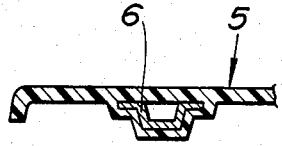
FIG. 7 is a sectional view taken along a line VII—VIII of FIG. 5.

FIGS. 5-8 show a conventional arrangement of a tonneau board for a hatchback type vehicle as disclosed in "Nissan Sābisu Shūhō (Nissan Service Weekly), No. 440, page 230, published by Nissan Motor Co., Ltd, June 1981. As shown in FIG. 5, a hatchback type vehicle 1 has right and left rear parcel side trims fixed in a rear end of a passenger compartment. Each of the trims 2 is formed with a step 3 extending longitudinally of the vehicle. A holder 4 is fixed to the step 3 of each trim 2. A tonneau board 5 is reinforced by one or more reinforce members 6 embedded in the board 5. The board 5 has right and left shafts 7 fixed to a front part of the underside of the board. A luggage room L is covered by the tonneau board 5 when the shafts 7 are rotatably gripped by the holders 4 and the board 5 is placed on the steps 3 of the right and left trims 2.

Figure 8:
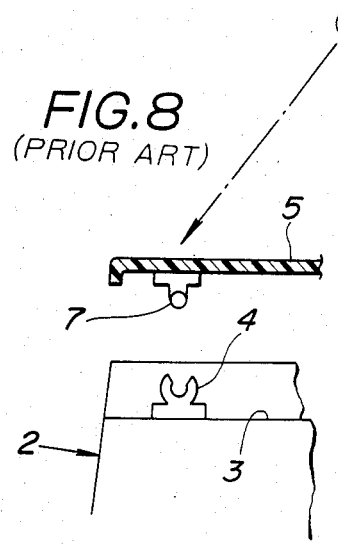
FIG. 8 is a sectional view taken along a line VIII—VIII of FIG. 5, showing a tonneau board in a disconnected state.

In this conventional arrangement, the front end of the board is fixed to the vehicle body by the pivotal connection between the shafts and holders, but the rear end of the board is not fixed to the vehicle body. Therefore, the rear end of the board is liable to bang and rattle on the steps 3 by swinging up and down with vehicle body vibrations. As shown in FIG. 8, the shafts 7 and holders 4 are concealed under the board 5. Therefore, it is difficult to locate the board in a proper position to insert the shafts 7 into the holders 4.

Figure 1:
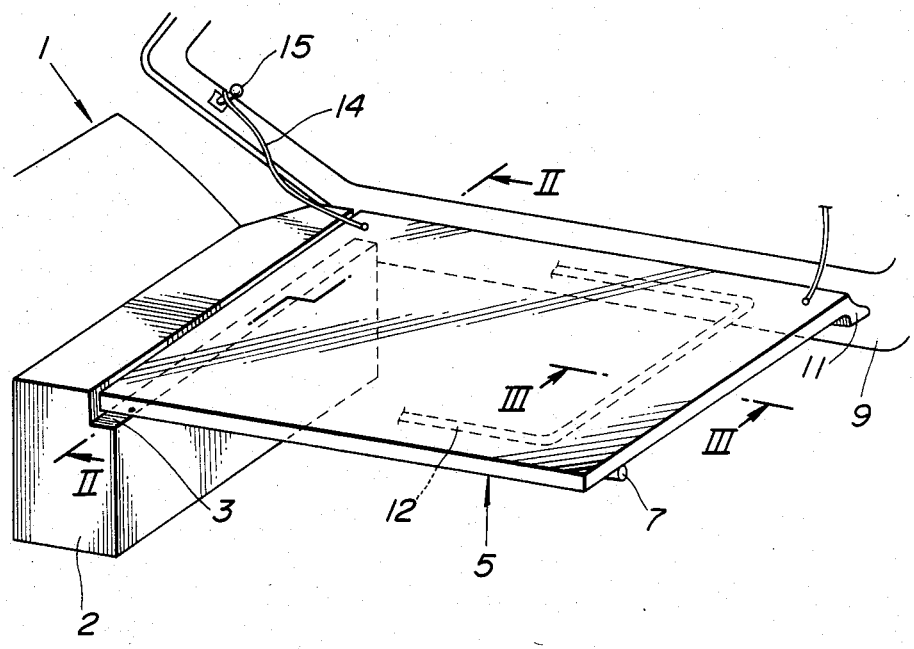
FIG. 1 is a perspective view of a rear end of a vehicle body showing one embodiment of the present invention.
Figure 2:
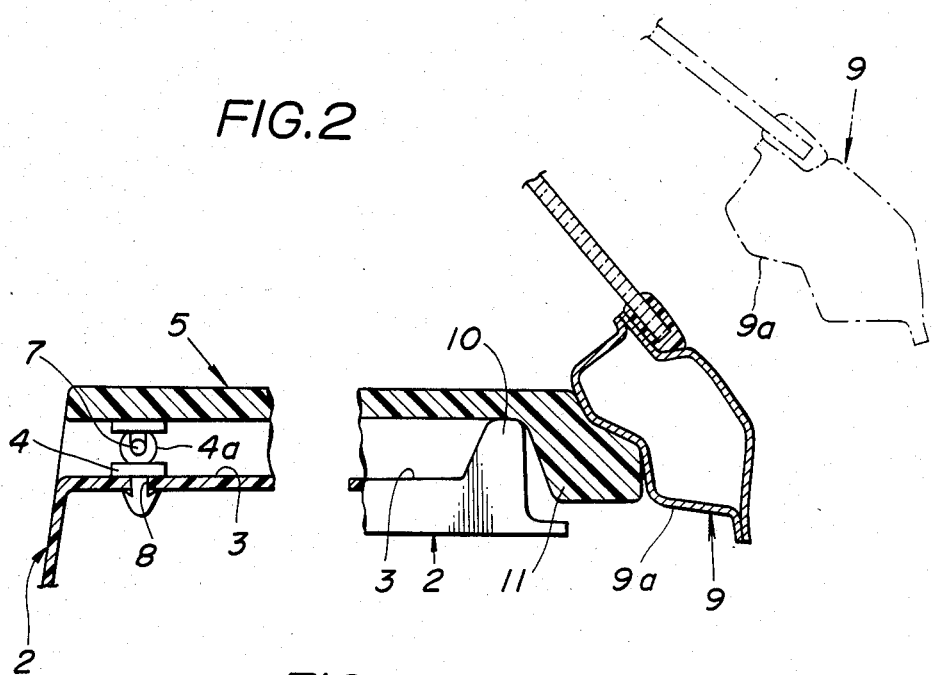
FIG. 2 is a sectional view taken along a line II—II of FIG. 1.
Figure 3:
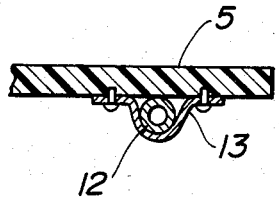
FIG. 3 is a sectional view taken along a line III—III of FIG. 1.

One embodiment of the present invention is shown in FIGS. 1, 2 and 3. As shown in FIG. 1, a hatchback type vehicle 1 has right and left rear parcel side trim, or luggage side trim, 2 which are fixedly mounted in a rear part of the interior of the vehicle 1 in a manner of bilateral symmetry. Each of the side trims 2 is formed with a step 3 extending longitudinally of the vehicle. As shown in FIG. 2, a front end of the step 3 of each trim 2 is formed with a hole 8, in which a holder 4 is inserted in such a manner that the holder 4 is fixed to the side trim 2. The holder 4 of each trim 2 has a receptacle portion 4a which has a C-shaped cross section opening upwards as shown in FIG. 2. A rear end of the step 3 of each trim 2 is formed with a stopper portion 10 lying near a back door panel 9a of a back door 9 in a closed position as shown by solid line in FIG. 2.

A tonneau board, or rear parcel shelf board, 5 for serving as a rear parcel shelf is supported on the steps 3 of the right and left side trims 2. A short shaft 7 is fixed to each of a front right-hand corner and a front left-hand corner of an underside of the tonneau board 5. The shafts 7 extends laterally of the vehicle in alignment with each other. When the right and left shafts 7 are pressed into the receptacle portions 4a of the right and left holders 4, respectively, the shafts 7 come into engagement with the receptacle portions 4a. In this engaged state, the shafts 7 are gripped by the receptacle portions 4a of the holders 4 rotatably so that the board 5 is swingable about an axis common to both shafts 7. The tonneau board 5 has a downwardly projecting rear end 11. When the tonneau board 5 is in the position shown in FIG. 2 in which the shafts 7 are received in the receptacle portions 4a of the holders 4 and the rear end portion of the board 5 rests on the stopper portion 10 of each side trims 2, the downwardly projecting rear end 11 lies between the stopper portion 10 and the back door panel 9a of the back door 9 in the closed state. A reinforce member or members 12 of a tubular shape is fixed to the underside of the tonneau board 5 by brackets 13. The rear end of the tonneau board 5 is connected to the back door 9 by right and left ropes 14. One end of each rope 14 is fixed to the rear right-hand or left-hand corner of the tonneau board 5, and the other end is hooked by a pin 15 fixed to the back door 9.

The shafts 7 of the tonneau board 5 can be easily disconnected from the holders 4 of the side trims 2 by applying an upward force on the front end of the tonneau board 5 by hand when the back door 9 is in the open state as shown by a one-dot chain line in FIG. 2. Therefore, it is easy to remove the tonneau board 5.

Figure 4:
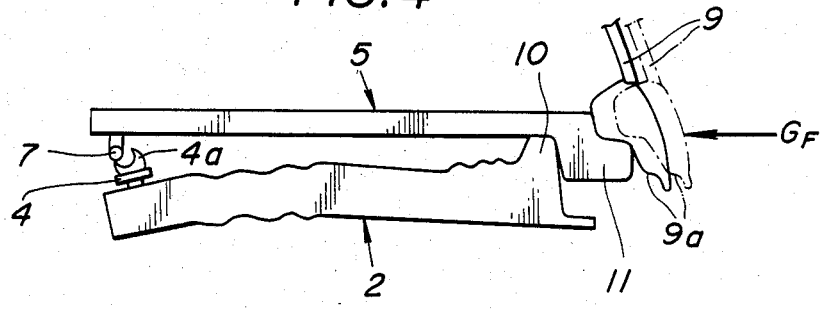
FIG. 4 is a sectional view similar to FIG. 2, for showing operation of the embodiment.

The tonneau board 5 can be installed again by opening the back door 9, and then placing the tonneau board 5 on the steps 3 of the right and left side trims 2. In this case, the tonneau board 5 can be easily located in a proper position by causing the downwardly projecting rear end 11 of the tonneau board 5 to abut against the stopper portions 10 of the right and left side trims 2. In this proper position, the right and left shafts 7 of the tonneau board 5 rest on the receptacle portions 4a of the right and left holders 4. Therefore, the shafts 7 can be easily pressed into the receptacle portions 4a of the holders 4 by pushing the front end of the tonneau board 5 downwardly. Finally, the back door 9 is closed and the tonneau board 5 is put in a fixed state. In the fixed state, the shafts 7 of the front end of the tonneau board 5 are gripped by the receptacle portions 4a of the holders 4, and the downwardly projecting rear end 11 of the tonneau board 5 is firmly clamped between the stopper portions 10 of the side trims 2 and the back door panel 9a of the back door 9 which is closed as shown by the solid line in FIG. 2. Therefore, the tonneau board 5 is fixed by the holders 4 at the front, and by the combination of the closed back door 9 and the stopper portions 11 in such a stable manner as to withstand vibrations of the vehicle body. If a forward force $G_F$ due to a rear end collision is applied on the closed back door 9 as shown in FIG. 4, the downwardly projecting rear end 11 of the tonneau board 5 in the fixed state is pressed between the forwardly pushed back door 9 and the stopper portions 10 of the trims 2. Therefore, the arrangement of the present invention can prevent the tonneau board 5 from plunging forwardly into the passenger compartment even if the rear parcel side trims 2 are deformed and the shafts 7 of the tonneau board 5 are disengaged from the holders 4, as shown in FIG. 4. The safety of the passengers can be ensured by this arrangement.

What is claimed is:

1. A vehicle comprising:
a vehicle body having at least one support portion,
a back door pivotally mounted on said vehicle body,
a board serving as a rear parcel shelf when said board is placed in a fixed position, said board having front and rear ends, said rear end being clamped between said support portion of said vehicle body and said back door when said board is in said fixed position and at the same time said back door is closed, and
pivot means for connecting said front end of said board with said vehicle body and permitting said board to swing about a pivot axis extending laterally of said vehicle body from said fixed position to an open position in which said rear end of said board is lifted up, said pivot means permitting said front end of said board to be disconnected from said vehicle body, wherein said rear end abuts against said support portion in such a manner as to limit said board from moving forwardly of said vehicle body when said board is in said fixed position, and wherein said vehicle body comprises a rear right side interior member and a rear left side interior member which are fixed to said vehicle body, each of said right and left interior members having a rear end which is formed with said support portion, and said pivot means comprises right pivot means for connecting said front end of said board to said right interior member and left pivot means for connecting said front end of said board to said left interior member.

2. A vehicle according to claim 1 wherein said rear end of said board is formed with a projection projecting downwardly, and abutting against a rearwardly facing surface of said support portion of each interior member when said board is in said fixed position.

3. A vehicle according to claim 2 wherein each of said right and left pivot means comprises a holder fixedly mounted on one of said right and left interior members and a shaft fixed to said front end of said board, said holder of each pivot means being capable of gripping said shaft in such a manner as to permit said shaft to rotate.

4. A vehicle according to claim 3 wherein said back door is pivoted at an upper end so that said back door is swingable about an axis parallel to said pivot axis of said board, and said rear end of said board is clamped between a lower end of said back door and said support portions.

5. A vehicle according to claim 4 further comprising at least one rope connecting said rear end of said board to said back door so as to lift up said rear end of said board from said fixed position when said back door is opened.

6. A vehicle according to claim 5 wherein each of said right and left interior members is formed with a step extending longitudinally of said vehicle body, said board being supported on said steps of said right and left interior members when said board is in said fixed position.

7. A vehicle according to claim 6 wherein said right and left interior members are right and left parcel side trims.

* * * * *